Patented Oct. 23, 1951

2,572,810

UNITED STATES PATENT OFFICE 2,572,810

PRODUCTION OF AMIDES

Charles F. Jelinek, Easton, Pa., assignor to General Aniline & Film Corporation, New York, N. Y., a corporation of Delaware No Drawing. Application March 18, 1948, Serial No. 15,740

11 Claims. (Cl. 260—561)

This invention relates to a process for the preparation of amides by a modification of the Willgerodt reaction, wherein an acetal is employed as a reactant in place of the ketones or other compounds heretofore employed.

The production of amides from ketones by oxidation of a ketone with aqueous ammonium polysulfide is well known in the art as the Willgerodt reaction, having first been described by Willgerodt in 1887. In accordance with this reaction, a ketone is heated with an aqueous solution of ammonium polysulfide to give an amide and the ammonium salt of the corresponding acid. This reaction has subsequently been shown to be effective in converting aldehydes to amides and it has also been found that in place of ammonium polysulfide, a mixture of ammonium hydroxide and sulfur may be employed or, if desired, a primary or secondary amine in admixture with sulfur may be employed as the reactant. In case an amine is employed in the reaction, it is customary to conduct the same in the absence of water and the reaction product, when employing an amine, is not the amide but the thioamide which, however, may be hydrolyzed in the same manner as the amide to give the corresponding acid.

I have now discovered that alkoxy substituted acetals, in spite of their known stability in alkaline media, may readily be converted into amides or thioamides by the mechanism of the Willgerodt reaction by merely substituting an alkoxy substituted acetal of the type hereinafter specified for the ketone or similar carbonyl compound which has heretofore been employed in the reaction.

The acetals which can be employed in practicing the present invention may be represented by the following general formula:

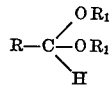

wherein $OR_1$ is a residue of an alcohol and R is an aliphatic hydrocarbon radical substituted by one or more alkoxy groups; the number of alkoxy groups attached to a single carbon being one, save when said carbon atom is terminal as in acetals of dialdehydes wherein the number of alkoxy groups attached to the terminal carbon atom is two. Since the alcohol corresponding to the radical $OR_1$ and the alcohol corresponding to the alkoxy substituent is split off during the reaction, from a practical standpoint it is preferable that $R_1$ be lower alkoxy. However, the process is operative when employing acetals of higher alcohols. As specific examples of alkoxy substituted acetals of this type which may be employed in practicing the present invention, there may be mentioned alkoxy substituted acetals of saturated aliphatic aldehydes, such as malonaldehyde tetramethyl acetal, malonaldehyde triethyl methyl acetal, 1,1,3-trimethoxybutane, 1,1,3-trimethoxyhexane, 1-methoxy-1,3-diethoxyhexane, 1,1,3 - triethoxy-5,5-dimethoxypentane, 1,1,3-triethoxy-5,7,7-trimethoxyheptane and the like.

When ammonium polysulfide or a mixture of ammonium hydroxide and sulfur are employed as the oxidizing agents, the reaction is generally carried out in the form of an aqueous solution. On the other hand, as is common in Willgerodt's reaction, when a mixture of a primary or secondary amine and sulfur is employed, the reaction is preferably carried out under anhydrous conditions. Examples of amines which may be employed in practicing the present invention include primary and secondary alkyl, aryl and heterocyclic amines, including by way of example, methylamine, dimethylamine, ethylamine, diethylamine, dibutylamine, isopropylamine, morpholine, piperidine, 1- and 2-naphthylamine, aniline and methyl aniline.

The reaction proceeds readily on heating a mixture of the reactants. Temperatures from 125° C. to as high as 230° C. have been found operative and in general, temperatures ranging from 150° C. to 200° C. appear to be the most satisfactory. In the event that one or more of the reactants is volatile at the reaction temperature, the reaction is preferably carried out in a closed vessel under pressure, but may be carried out at atmospheric pressure if the particular reactants employed remain liquid or can be refluxed at atmospheric pressure. It has also been found beneficial, although not essential, to employ a mutual solvent for the reactants, such as dioxane, particularly when acetals of relatively high molecular weight are employed as one of the reactants.

The products obtained by the process of this invention are amides of mono and dibasic acids depending upon the alkoxy substituted acetal employed. The amides obtained from the acetals mentioned above are as follows:

| Acetal | Amide |
| --- | --- |
| Malonaldehyde acetal | Malonic acid. |
| 1,1,3-Trimethoxybutane | Butyric acid. |
| 1,1,3-Trimethoxyhexane | Caproic acid. |
| 1,3-Diethoxy-1-methoxyhexane | Caproic acid. |
| 1,1,3-Triethoxy-5,5-dimethoxypentane | Glutaric acid. |
| 1,1,3-Triethoxy-5,7,7-trimethoxyheptane | Pimelic acid. |

The following specific examples illustrate specific embodiments of the present invention. The parts are by weight.

Example 1

A mixture of 3 parts of 1,1,3-trimethoxybutane, 10 parts of dioxane and an ammonium polysulfide solution, prepared by passing hydrogen sulfide into 10 parts of concentrated ammonium hydroxide and 1 part of sulfur until the sulfur dissolved, was charged into a Carius tube. The tube was sealed and then heated for 12 hours at 160° C. After removal from the tube, the reaction mixture was evaporated to dryness on a steam bath, and 20 parts of water were added to the residue. After filtration to remove the unreacted sulfur, the mixture was again evaporated to dryness and the butyramide recrystallized from benzene to give butyramide (M. P. 115–116° C.) in 80% yield.

Example 2

A mixture of 44 parts of 1,1,3-triethoxy-5,5-dimethoxypentane, 10 parts of dioxane, and an ammonium polysulfide solution prepared by passing hydrogen sulfide into 220 parts concentrated ammonium hydroxide and 22 parts of sulfur until the sulfur dissolved was heated in a pressure reactor for 4 hours. The reaction mixture was thus evaporated to dryness to obtain crude glutaramide. A portion of the dry reaction product was subjected to alkaline hydrolysis by heating with 15% sodium hydroxide solution for 6 hours. Upon acidification, concentration of the solution and extraction with ether, glutaric acid was obtained melting at 97–98° C.

It will, of course, be understood that the foregoing examples are merely illustrative and are not to be regarded as limiting the invention thereby. Various modifications of this invention will be obvious to a worker in the art and such modifications are accordingly intended to be included within the purview of this application and the scope of the appended claims. The term "amide" in the appended claims is employed in its generic sense as including both the usual oxoamides and the thioamides in which the oxygen of the carbonyl group is replaced with sulfur.

I claim:

1. A process of preparing an amide of a carboxylic acid which comprises reacting by heating at a temperature of from about 125 to about 230° C., a mixture of an acetal of the formula:

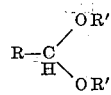

wherein R' represents an alkyl radical and R represents an alkoxy-substituted alkyl radical in which no more than one alkoxy group is attached to a non-terminal carbon atom in the alkyl chain, with sulfur and a basic nitrogen compound in which the nitrogen carries at least one hydrogen atom and which is selected from the group consisting of ammonia, primary and secondary lower alkyl amines, primary and N-lower alkyl aryl amines, morpholine and piperidine.

2. A process of preparing an amide of a carboxylic acid which comprises reacting by heating at a temperature of from about 125 to about 230° C., a mixture of an acetal of the formula:

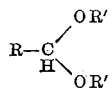

wherein R' represents an alkyl radical and R represents an alkoxy-substituted alkyl radical in which no more than one alkoxy group is attached to a non-terminal carbon atom in the alkyl chain, with sulfur and aqueous ammonia.

3. A process of preparing an amide of a carboxylic acid which comprises reacting by heating at a temperature of from about 125 to about 230° C., a mixture of an acetal of the formula:

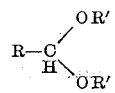

wherein R' represents an alkyl radical and R represents an alkoxy-substituted alkyl radical in which no more than one alkoxy group is attached to a non-terminal carbon atom in the alkyl chain, with sulfur and ammonia, the sulfur and ammonia being supplied by an aqueous ammonium polysulfide solution.

4. The process for producing fatty acid amides which comprises reacting by heating at a temperature of from about 125 to about 230° C., a mixture of a dialkyl acetal of a monoalkoxy-substituted alkanal with sulfur and aqueous ammonia.

5. The process for producing fatty acid amides which comprises reacting by heating at a temperature of from about 125 to about 230° C., a mixture of a dialkyl acetal of a monoalkoxy-substituted alkanal with sulfur and ammonia, the sulfur and ammonia being supplied by an aqueous ammonium polysulfide solution.

6. The process for producing butyramide which comprises reacting by heating 1,1,3-trimethoxybutane with sulfur and aqueous ammonia at a temperature of about 160° C.

7. The process for producing butyramide which comprises reacting by heating 1,1,3-trimethoxy butane with sulfur and ammonia, at a temperature of about 160° C., the sulfur and ammonia being supplied by an aqueous ammonium polysulfide solution.

8. The process for producing a dibasic acid amide which comprises reacting by heating at a temperature of about 125 to about 230° C., a tetraalkyl acetal of an alkoxy-substituted alkandial with sulfur and aqueous ammonia.

9. The process for producing a dibasic acid amide which comprises reacting by heating at a temperature of about 125 to about 230° C., a tetraalkyl acetal of an alkoxy-substituted alkandial with sulfur and ammonia, the sulfur and ammonia being supplied by an aqueous ammonium polysulfide solution.

10. The process for producing glutaramide which comprises reacting by heating 1,1,3-triethoxy-5,5-dimethoxy pentane with sulfur and aqueous ammonia at a temperature of about 125 to about 230° C.

11. The process for producing glutaramide which comprises reacting by heating 1,1,3-triethoxy-5,5-dimethoxy pentane with sulfur and ammonia, at a temperature of from about 125 to about 230° C., the sulfur and ammonia being supplied by an aqueous ammonium polysulfide solution.

CHARLES F. JELINEK.

REFERENCES CITED

The following references are of record in the file of this patent:

FOREIGN PATENTS

| Number | Country | Date |
| --- | --- | --- |
| 403,123 | Germany | Sept. 25, 1924 |
| 405,675 | Germany | Nov. 4, 1924 |
| 450,218 | Great Britain | July 9, 1936 |

OTHER REFERENCES

Willgerodt, "Ber. Deut. Chem." vol. 21, p. 535 (1888).

Kindler, "Liebigs Annalen," vol. 431, pp. 224 and 226 (1923).

Karrer, "Organic Chemistry," p. 142 (1938).

Richters, "Organic Chemistry," vol. I, (1944).

Cavalieri et al., "J. Am. Chem. Soc.," vol. 67, p. 1785, Oct. 1945.

Carmack et al., "J. Am. Chem. Soc.," vol. 68, p. 2029, Oct. 1946.